(12) United States Patent
Marchesotti

(10) Patent No.: US 9,082,047 B2
(45) Date of Patent: Jul. 14, 2015

(54) LEARNING BEAUTIFUL AND UGLY VISUAL ATTRIBUTES

(71) Applicant: Xerox Corporation, Norwalk, CT (US)

(72) Inventor: Luca Marchesotti, Grenoble (FR)

(73) Assignee: XEROX CORPORATION, Norwalk, CT (US)

( * ) Notice: Subject to any disclaimer, the term of this patent is extended or adjusted under 35 U.S.C. 154(b) by 63 days.

(21) Appl. No.: 13/971,092

(22) Filed: Aug. 20, 2013

(65) Prior Publication Data

US 2015/0055854 A1    Feb. 26, 2015

(51) Int. Cl.
G06K 9/62 (2006.01)
(52) U.S. Cl.
CPC ...................... *G06K 9/627* (2013.01)
(58) Field of Classification Search
None
See application file for complete search history.

(56) References Cited

U.S. PATENT DOCUMENTS

| | | | |
|---|---|---|---|
| 8,204,842 B1 * | 6/2012 | Zhang et al. | 706/45 |
| 8,386,574 B2 | 2/2013 | Chidlovskii et al. | |
| 2003/0021481 A1 | 1/2003 | Kasutani | |
| 2004/0076345 A1 * | 4/2004 | Olszak et al. | 382/309 |
| 2005/0050086 A1 * | 3/2005 | Liu et al. | 707/102 |
| 2007/0005356 A1 | 1/2007 | Perronnin | |
| 2007/0258648 A1 | 11/2007 | Perronnin | |
| 2008/0069456 A1 | 3/2008 | Perronnin | |
| 2008/0240572 A1 | 10/2008 | Hoshii | |
| 2008/0285860 A1 * | 11/2008 | Datta et al. | 382/224 |
| 2008/0317358 A1 | 12/2008 | Bressan et al. | |
| 2009/0144033 A1 | 6/2009 | Liu et al. | |
| 2009/0208118 A1 | 8/2009 | Csurka | |
| 2009/0232409 A1 | 9/2009 | Marchesotti et al. | |
| 2010/0040285 A1 | 2/2010 | Csurka et al. | |
| 2010/0082615 A1 | 4/2010 | Clinchant et al. | |
| 2010/0092084 A1 | 4/2010 | Perronnin et al. | |
| 2010/0098343 A1 | 4/2010 | Perronnin et al. | |
| 2010/0191743 A1 | 7/2010 | Perronnin et al. | |
| 2010/0226564 A1 | 9/2010 | Marchesotti et al. | |
| 2010/0290699 A1 * | 11/2010 | Adam et al. | 382/155 |
| 2010/0318477 A1 | 12/2010 | Perronnin et al. | |
| 2011/0026831 A1 | 2/2011 | Perronnin et al. | |
| 2011/0040711 A1 | 2/2011 | Perronnin et al. | |
| 2011/0052063 A1 | 3/2011 | McAuley et al. | |
| 2011/0072012 A1 | 3/2011 | Ah-Pine et al. | |

(Continued)

OTHER PUBLICATIONS

Sawant et al, "Automatic Image Semantic Interpretation using Social Action and Tagging Data," 2011, Multimedia Tools and Applications 51.1, pp. 1-31.*

(Continued)

*Primary Examiner* — Aaron W Carter
*Assistant Examiner* — David F Dunphy
(74) *Attorney, Agent, or Firm* — Fay Sharpe LLP

(57) ABSTRACT

A method for learning visual attribute labels for images includes, from textual comments associated with a corpus of images, identifying a set of candidate textual labels that are predictive of aesthetic scores associated with images in the corpus. The candidate labels in the set are clustered into a plurality of visual attribute clusters based on similarity and each of the clusters assigned a visual attribute label. For each of the visual attribute labels, a classifier is trained using visual representations of images in the corpus and respective visual attribute labels. The visual attribute labels are evaluated, based on performance of the trained classifier. A subset of the visual attribute labels is retained, based on the evaluation. The visual attribute labels can be used in processes such as image retrieval, image labeling, and the like.

20 Claims, 8 Drawing Sheets

(56) References Cited

U.S. PATENT DOCUMENTS

| | | |
|---|---|---|
| 2011/0091105 A1 | 4/2011 | Perronnin |
| 2011/0137898 A1 | 6/2011 | Gordo et al. |
| 2011/0184950 A1 | 7/2011 | Skaff et al. |
| 2012/0045134 A1 | 2/2012 | Perronnin et al. |
| 2012/0076401 A1 | 3/2012 | Sanchez et al. |
| 2012/0143853 A1 | 6/2012 | Gordo et al. |
| 2012/0158739 A1 | 6/2012 | Ah-Pine et al. |
| 2012/0163710 A1 | 6/2012 | Skaff |
| 2012/0163715 A1 | 6/2012 | Murray et al. |
| 2012/0269425 A1 | 10/2012 | Marchesotti et al. |
| 2012/0269441 A1 | 10/2012 | Marchesotti et al. |
| 2013/0080426 A1* | 3/2013 | Chen et al. ............... 707/723 |
| 2013/0108179 A1 | 5/2013 | Marchesotti et al. |
| 2013/0156341 A1 | 6/2013 | Marchesotti et al. |
| 2013/0182909 A1 | 7/2013 | Rodriguez-Serrano et al. |
| 2013/0268535 A1* | 10/2013 | Inaba et al. ............... 707/740 |
| 2013/0326625 A1* | 12/2013 | Anderson et al. ............ 726/23 |

OTHER PUBLICATIONS

U.S. Appl. No. 13/480,598, filed May 25, 2012, Murray, et al.

Berg, et al. "Automatic attribute discovery and characterization from noisy web data" ECCV, 2010, pp. 663-676.

Bottou, et al. "The tradeoffs of large scale learning" NIPS 2007, pp. 161-168.

Csurka, et al. "Visual categorization with bags of keypoints" Workshop on statistical learning in computer vision, ECCV, 2004, vol. 1, pp. 1-16.

Datta, et al. "Studying aesthetics in photographic images using a computational approach" ECCV, 2006, pp. 1-14.

Datta, et al. "Algorithmic inferencing of aesthetics and emotion in natural images: an exposition" ICIP, 2008, pp. 105-108.

Datta, et al. "Learning the consensus on visual quality for next-generation image management" ACM-MM, Sep. 23-28, 2007, pp. 533-536.

Dhar, et al. "High level describable attributes for predicting aesthetics and interestingness" CVPR, 2011, pp. 1657-1664.

Duan, et al. "Discovering localized attributes for fine-grained recognition" CVPR, 2012, pp. 3474-3481.

Farhadi, et al. "Describing objects by their attributes" CVPR, 2009, pp. 1778-1785.

Ferrari, et al. "Learning visual attributes" NIPS, 2007, pp. 1-8.

Hofmann, et al. "Unsupervised learning by probabilistic latent semantic analysis" Machine Learning, 2001, vol. 42, pp. 177-196.

Jegou, et al. "Product quantization for nearest neighbor search" IEEE TPAMI vol. 33, 2011, pp. 117-128.

Ke, et al. "The design of high-level features for photo quality assessment" CVPR, 2006, vol. 1, pp. 419-426.

Lampert, et al. "Learning to detect unseen object classes by between-class attribute transfer" CVPR, 2009, pp. 951-958.

Lowe, D.G. "Object recognition from local scale-invariant features" ICCV, 1999, pp. vol. 2, pp. 1150-1157.

Luo, et al. "Photo and video quality evaluation: focusing on the subject" ECCV, 2008, pp. 386-399.

Marchesotti, et al. "Assessing the aesthetic quality of photographs using generic image descriptors" ICCV, 2011, pp. 1784-1791.

Murray, et al. "AVA: a large-scale database for aesthetic visual analysis" CVPR, 2012, pp. 2408-2415.

Murray, et al. "Learning to rank images using semantic and aesthetic labels" BMVC, 2012, pp. 110.1-110.10.

Ng, et al. "On spectral clustering: analysis and an algorithm" NIPS, 2002, pp. 849-856.

Oliva, et al. "Modeling the shape of the scene: a holistic representation of the spatial envelope" IJCV 42(3), 2001, pp. 145-175.

Orendovici, et al. "Training data collection system for a learning-based photo-graphic aesthetic quality inference engine" ACM-MM, 2010, pp. 1575-1578.

Pang, et al. "Thumbs up?: sentiment classification using machine learning techniques" Proc. of the ACL-02 Conf. on Empirical methods in natural language processing, 2012, pp. 79-86.

Parikh, et al. "Interactively building a discriminative vocabulary of nameable attributes" CVPR, 2011, pp. 1681-1688.

Parikh, et al. "Relative attributes" ICCV, 2011, pp. 503-510.

Perronnin, et al. "Fisher kernels on visual vocabularies for image categorization" CVPR, 2007, pp. 1-8.

Perronnin, et al. "Improving the Fisher kernel for large-scale image classification" ECCV, 2010, 6314, pp. 143-156.

Riloff, et al. "Feature subsumption for opinion analysis" Proc. of the 2006 Conf. on Empirical Methods in Natural Language Processing, 2006, pp. 440-448.

Rohrbach, et al. "What helps where -and why? semantic relatedness for knowledge transfer" CVPR, 2010, pp. 1-8.

San Pedro, et al. "Leveraging user comments for aesthetic aware image search reranking" WWW, 2012, pp. 439-448.

Tibshirani, et al. "Regression shrinkage and selection via the lasso" Journal of the Royal Statistical society, Series B (Methodological), 1996, pp. 267-288.

Wang, et al. "Learning models for object recognition from natural language descriptions" BMVC, 2009, pp. 1-10.

Yanai, et al. "Image region entropy: a measure of visualness of web images associated with one concept" ACM-MM, 2005, pp. 419-422.

Zou, et al. "Regularization and variable selection via the elastic net" Journal of the Royal Statistical Society, 2005, pp. 301-320.

Clinchant, et al. "XRCE's participation in ImageEval" ImageEval Workshop at CVIR, 2007, pp. 1-8.

* cited by examiner

LEARNING BEAUTIFUL AND UGLY VISUAL ATTRIBUTES

BACKGROUND

The exemplary embodiment relates to the evaluation of aesthetic quality in images and finds particular application in connection with a system and method for learning classifiers for visual attributes of images that relate to an overall assessment of image quality and for using the trained classifiers for visual attribute-based querying.

To assist in processing of images and videos, computer vision techniques have been developed, such semantic recognition, for identifying the visual content of an image. These techniques are able to predict whether an image is of a dog or a cat, for example. However, predicting whether an image will be perceived as visually appealing to people is more challenging and people themselves are often unable to pinpoint why a particular image is attractive or unattractive. Some attempts have, however, been made to evaluate aesthetic qualities of images by computer-implemented methods. See, for example R. Datta, et al., "Studying aesthetics in photographic images using a computational approach," ECCV 2006; Y. Ke, et al., "The design of high-level features for photo quality assessment," CVPR, 2006; R. Datta, et al., "Learning the consensus on visual quality for next-generation image management," ACM-MM 2007; Y. Luo, et al., "Photo and video quality evaluation: Focusing on the subject," ECCV 2008, pp. 386-399, hereinafter, "Luo 2008"; R. Datta, et al., "Algorithmic inferencing of aesthetics and emotion in natural images: An exposition," ICIP 2008; S. Dhar, et al., "High level describable attributes for predicting aesthetics and interestingness," CVPR 2011, hereinafter, "Dhar 2011"; L. Marchesotti, et al., "Assessing the aesthetic quality of photographs using generic image descriptors," ICCV 2011, pp. 1784-1791, hereinafter, "Marchesotti 2011"; and N. Murray, et al., "Ava: A large-scale database for aesthetic visual analysis," CVPR 2012, hereinafter, "Murray 2012".

Some aesthetic prediction methods have proposed to mimic the best practices of professional photographers. A general approach has been to select rules (e.g., "contains opposing colors") from photographic resources, such as the book by Kodak, entitled "How to take good pictures: a photo guide," Random House Inc., 1982, and then to design for each rule, a visual feature to predict the image compliance (e.g., a color histogram). More recently, attempts have focused on adding new photographic rules and on improving the visual features of existing rules. See, Luo 2008; Dhar 2011. Dhar 2011 suggests that the rules can be understood as visual attributes, i.e., medium-level descriptions whose purpose is to bridge the gap between the high-level aesthetic concepts to be recognized and the low-level pixels. See, also V. Ferrari, et al., "Learning visual attributes," NIPS 2007; C. H. Lampert, et al., "Learning to detect unseen object classes by between-class attribute transfer," CVPR 2009, pp. 951-958; and A. Farhadi, et al., "Describing objects by their attributes," CVPR 2009.

However, there are several issues with such an approach to aesthetic prediction. First, the manual selection of attributes from a photographic guide is not exhaustive and does not give any indication of how much and when such rules are used. Second, manually designed visual features model only imperfectly the corresponding rules. As an alternative to rules and hand-designed features, it has been proposed to rely on generic features. See, Marchesotti 2011. Such generic features include the GIST (described in A. Oliva, et al., "Modeling the shape of the scene: a holistic representation of the spatial envelope, IJCV 42(3), 145-175, 2001), the bag-of-visual-words (BOV) (see, G. Csurka, et al., "Visual categorization with bags of keypoints," Workshop on statistical learning in computer vision, ECCV, 2004) and the Fisher vector (FV) (see, F. Perronnin, et al., "Improving the Fisher kernel for large-scale image classification, ECCV 2010, pp. 143-156 (hereinafter, Perronnin 2010); and Marchesotti 2011).

While it has been shown experimentally that such an approach can lead to improved results with respect to hand-designed attribute techniques, one shortcoming is that the results lack interpretability. In other words, while it is possible to say that an image has a high or low aesthetic value, it is not possible to tell why. It would be advantageous to be able to preserve the advantages of generic features for predicting aesthetic quality while also providing interpretable results.

INCORPORATION BY REFERENCE

The following references, the disclosures of which are incorporated herein by reference in their entireties, are mentioned:

U.S. application Ser. No. 13/480,598, filed on May 25, 2012, entitled IMAGE SELECTION BASED ON PHOTOGRAPHIC STYLE, by Naila Murray and Luca Marchesotti.

U.S. Pub. No. 20090232409, published Sep. 17, 2009, entitled AUTOMATIC GENERATION OF A PHOTO GUIDE, by Luca Marchesotti, et al.

U.S. Pub. No. 20120163710, published Jun. 28, 2012, entitled IMAGE RANKING BASED ON ABSTRACT CONCEPTS, by Sandra Skaff, et al.

U.S. Pub. No. 20120269425, published Oct. 25, 2012, entitled PREDICTING THE AESTHETIC VALUE OF AN IMAGE, by Luca Marchesotti, et al.

U.S. Pub. No. 20120269441, published Oct. 25, 2012, entitled IMAGE QUALITY ASSESSMENT, by Luca Marchesotti, et al.

U.S. Pub. No. 20130156341, published Jun. 20, 2013, entitled AUTOMATIC GENERATION OF A PHOTO GUIDE, by Luca Marchesotti, et al.

U.S. Pub. No. 20130108179, published May 2, 2013, entitled PERSONALIZED PHOTO CALENDAR GENERATION SYSTEM AND METHOD, by Luca Marchesotti, et al.

U.S. Pub. No. 20120294514, published Nov. 22, 2012, entitled TECHNIQUES TO ENABLE AUTOMATED WORKFLOWS FOR THE CREATION OF USER-CUSTOMIZED PHOTOBOOKS, by Craig Saunders, et al.

BRIEF DESCRIPTION

In accordance with one aspect of the exemplary embodiment, a method for learning visual attribute labels for images includes, from textual comments associated with a corpus of images, identifying a set of candidate textual labels that are predictive of aesthetic scores associated with images in the corpus. The candidate labels in the set are clustered into a plurality of visual attribute clusters based on similarity and each of the clusters assigned a respective visual attribute label. For each of the visual attribute labels, a classifier is trained using visual representations of images in the corpus and respective visual attribute labels. The visual attribute labels are evaluated, based on performance of the trained classifier. A subset of the visual attribute labels is retained, based on the evaluation.

At least one of the identifying a set of candidate textual labels, clustering the candidate labels, training the classifier, and evaluating the classifier performance may be performed with a processor.

In accordance with one aspect of the exemplary embodiment, a system for learning visual attribute labels for images includes a text representation generator which generates a text-based representation for each of a set of images in a corpus based on textual comments associated with the image. An aesthetic score computing component computes an aesthetic score for each image based on a set of user-applied aesthetic rankings for the images. A text feature selector identifies a set of textual features based on the text representations and respective aesthetic scores for images in the corpus. A clustering component clusters the identified textual features into visual attribute clusters, each of the visual attribute clusters being assigned a visual attribute label. An attribute classifier learning component trains a classifier for each of the visual attributes using visual representations of images in the corpus. An attribute ranking component ranks the visual attribute labels based on performance of the trained classifiers. A processor implements the text representation generator, aesthetic score computing component, text feature selector, clustering component, attribute classifier learning component and attribute ranking component.

In accordance with one aspect of the exemplary embodiment, a method includes receiving an input query comprising one of an image and a visual attribute label selected from a predefined set of visual attribute labels. Where the query comprises an image, the method includes assigning at least one visual attribute label to the image based on a visual feature-based representation of the image, the at least one visual attribute label being selected from the set of visual attribute labels. Where the query comprises a visual attribute label, the method includes retrieving at least one image from a collection of images in which images are labeled with visual attribute labels selected from the set of visual attribute labels. The visual attribute labels are based on textual features extracted from textual comments associated with images in a corpus, the textual features being selected using a regression function that minimizes, over images in the corpus, an error between aesthetic scores assigned to the images in the corpus and respective predicted aesthetic scores for the images that are based on textual features extracted from the comments for each of the images.

The assigning of the at least one visual attribute label or the retrieving at least one image from the collection may be performed with a processor.

DETAILED DESCRIPTION

Aspects of the exemplary embodiment relate to a system and method for automatically learning sets of visual attributes that are predictive of aesthetic quality from a corpus composed of images, textual comments, and other metadata, such as image aesthetic ratings, and for predicting those visual attributes using classifiers that are trained on generic features. In one aspect, the method includes: (i) automatically discovering a vocabulary of visual attributes and (ii) learning their visual appearance using generic features.

The learned visual attributes provide a mid-level feature representation that combines the benefits of "attributed-based" and "generic" techniques for aesthetic image analysis.

Figure 1:
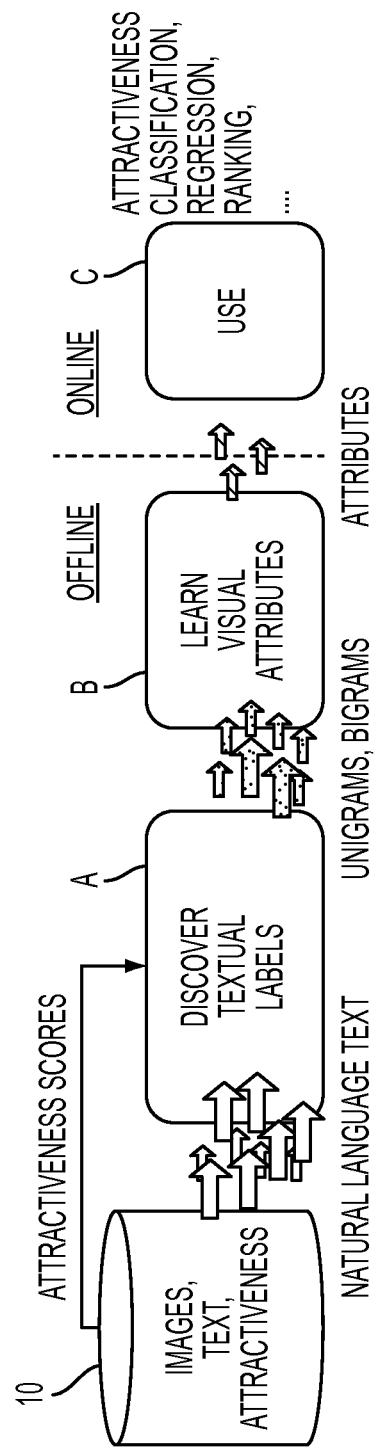
FIG. 1 is an overview of a system and method for automatically learning visual attributes which contribute to a perception of aesthetic quality in images from an annotated corpus of images.

FIG. 1 illustrates an overview of a pipeline capable of learning visual attributes. Potential visual attribute labels are automatically discovered and learned using a training corpus 10 containing images, textual comments on the images, and aesthetic preference ratings. The pipeline includes several steps that lead to the definition of visual attributes correlating with aesthetic preference, which broadly includes discovering textual labels (A) and learning visual attribute classifiers from them (B). The learned attribute classifiers can then be used in a variety of online processes (C).

Figure 2:
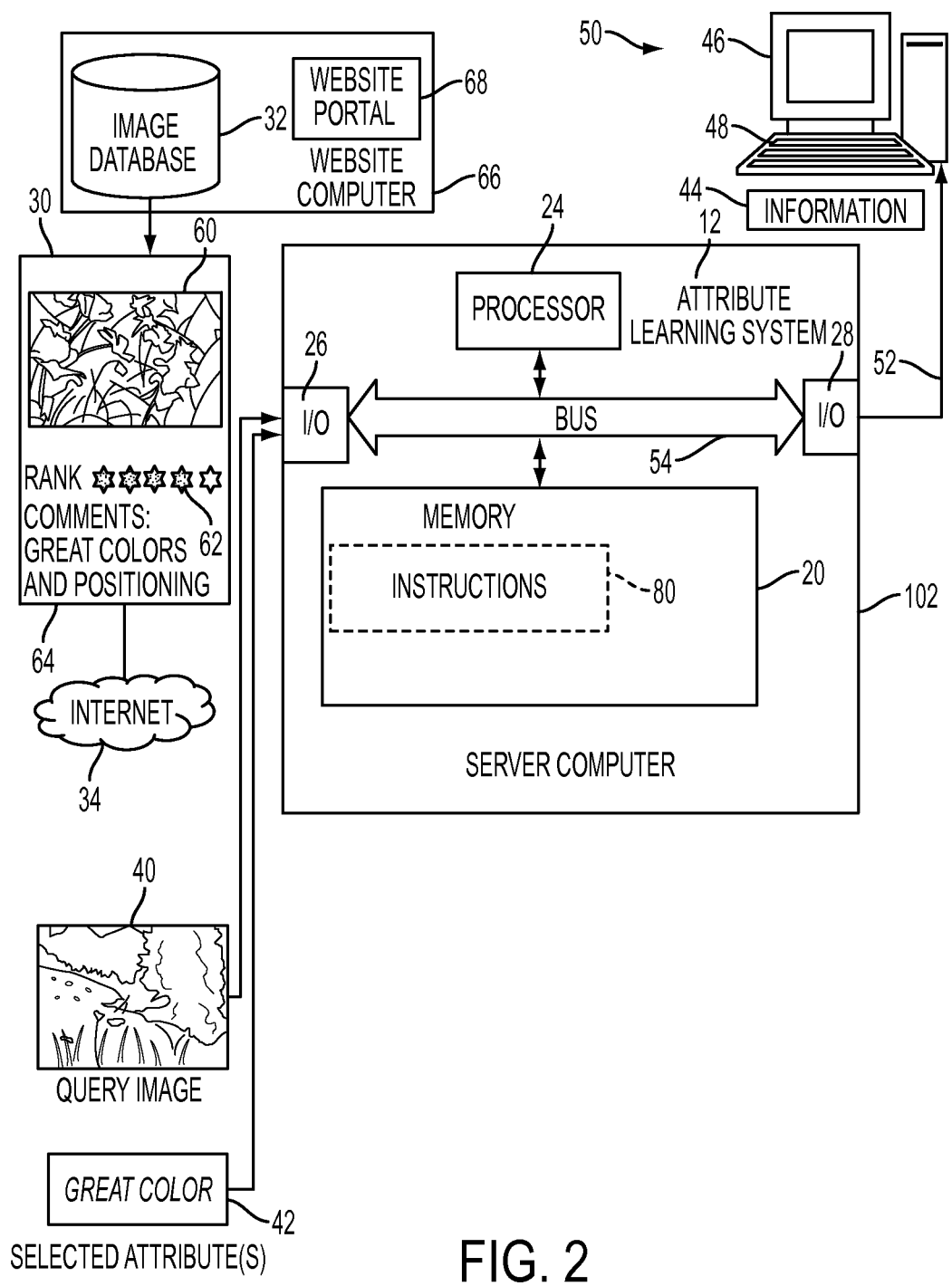
FIG. 2 is a functional block diagram of a system for automatically learning (and using) visual attributes in accordance with one aspect of the exemplary embodiment.
Figure 3:
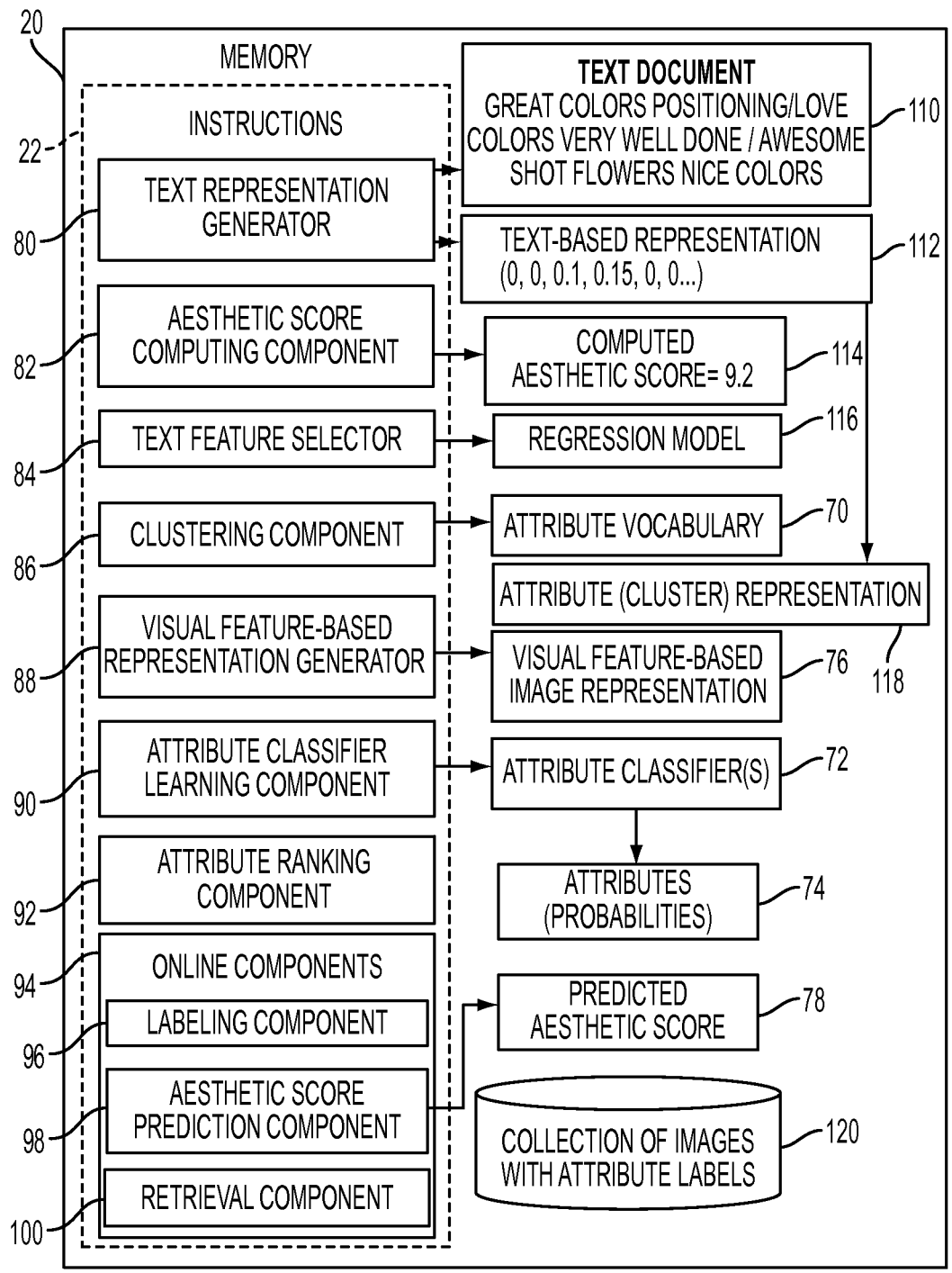
FIG. 3 illustrates part of the system of FIG. 2 in accordance with one exemplary embodiment.

FIGS. 2 and 3 illustrate a computer-implemented system 12 for learning a set of visual attributes that correlate with aesthetic preferences for images. The computer-implemented system is capable of learning visual attributes useful in predicting aesthetic preference and/or for employing the learned visual attributes on one of a variety of applications. As shown in FIG. 2, the system 12 includes memory 20 which stores instructions 22 for performing the method outlined in FIG. 4 and a processor 24 in communication with the memory which executes the instructions. The processor 24 may also control the overall operation of the computer system 12. Computer system 12 also includes one or more input/output (I/O) interfaces 26, 28 for communicating with external devices. For example, a first network interface 26 receives training data, such as image data 30 for images in the training corpus 10 from the database 32, via a link 34 and subsequently receives test data, such as a query image 40 to be processed by the system or selected visual attributes 42 for an image search. The same or a second interface 28 outputs information 44, such as information derived by processing the test data. The I/O interface 28 may communicate with one or more of a display device (or other output device) 46, for displaying/outputting information to users, and a user input device 48, such as a keyboard or touch or writable screen, and/or a cursor control device, such as mouse, trackball, or the like, for inputting text and for communicating user input information and command selections to the processor 24. In the illustrated embodiment, components 46, 48 are part of a client computing device 50 that is communicatively connected with the system 12 via a link 52, although it is to be appreciated that they may be directly linked to the system 12. Links 34, 52 can each be a wired or wireless link, such as a local or wide area network such as the Internet. The various hardware components 20, 24, 26, 28 of the computer system 12 may all be communicatively connected by a data/control bus 54.

The exemplary database 32 stores the corpus 10 of training data 30, including photographic images 60, as well as aesthetic preference ratings 62 and textual comments 64 for some or all of the images 60. The database 32 may be hosted by a separate computing device 66, and be accessible via a website portal 68. In other embodiments, database 32 may be stored local to the system 12 or in system memory 20 itself. The preference ratings 32 may be in the form of a rank or other measure which authorized users of the website are permitted to assign to the images 60. The preference rating 62 assigned by a user to an image may be on a continuous scale or graduated, as in the 5 star rating scheme exemplified, where 0 stars indicates that the voter considers the image aesthetically unpleasing (ugly) and 5 indicates that the voter considers the image aesthetically pleasing (beautiful). Graduations between these two extremes indicate various levels of aesthetic preference. The comments 64 may each include a short textual description which explains why the user voting on the image 60 considers the image to be aesthetically pleasing (or not). The rating and comments may be stored in metadata of the respective image 60, e.g., as tags, may be otherwise associated with the image. Each image may have more than one or more comments and/or ratings by different users.

Referring also to FIG. 3, which illustrates the contents of memory 20 in greater detail, the system 12 supervises the creation of a visual attribute vocabulary 70 and automatic learning of the visual appearance of visual attributes by generating a set of visual attribute classifiers 72 (or a single multi-class classifier). The classifiers 72 are configured for assigning visual attributes 74 from the vocabulary 70 to an input image, based on a visual feature-based representation 76 of the input image, which can be used to predict an aesthetic score 78 for the input image.

The system 12 includes various components for implementing the exemplary method which can be in the form of hardware or, as illustrated, in the form of software instructions 22 that are implemented by the processor 24. The illustrated components include a text representation generator 80, an aesthetic score computing component 82, a text feature selector 84, a clustering component 86, a visual-feature-based representation generator 88, an attribute classifier learning component 90, an attribute ranking component 92, and optionally one or more online processing components 94, such as an image labeling component 96, an aesthetic score prediction component 98, and/or a retrieval component 100. These components are illustrated on a single computer 102 for ease of illustration, although it is to be appreciated that not all the components may be needed, they may be separate or combined, and the learning of the visual attributes and classifiers may be performed offline on a separate computing device. The operation of the components is described in greater detail below. Briefly, the text representation generator 80 accesses the corpus 10 of labeled images and mines the associated metadata to extract the associated textual comments 64. The comments for each image are aggregated to form a text document 110 and a statistical representation 112 of the text document is generated by the text representation generator 80, based on at least some of the words identified in the text document 110.

The aesthetic score computing component 82 retrieves a set of the aesthetic quality ratings 62 for each image 60 and aggregates, e.g., averages, the ratings to generate an overall aesthetic score 114.

The text feature selector 84 identifies, from the words of each of the text documents 110, a set of textual features (such as unigrams or bigrams) which are most discriminative for the aesthetic scores 114 of the images, e.g., by using regression analysis. This may include computing a regression model 116, which stores a regression coefficient for each of a set of the discriminative textual features, and which may be stored in memory 20.

The clustering component 86 clusters the most discriminative textual features into clusters, based on word similarity and regression coefficients. The clusters form the visual attribute vocabulary 70, with each cluster being assigned a visual attribute label based on one or more of the textual features assigned to that cluster.

The visual feature-based representation generator 88 extracts a visual feature-based representation 76 of each training image 60, based on visual features of the image. These generic feature based representations 76 are then used by the learning component 90 to learn a classifier 72 for each of the visual attributes in the vocabulary 70.

The attribute ranking component 92 ranks the visual attributes in the vocabulary, based on the performance of the classifiers 72 and filters out those visual attributes whose performance does not meet at least one performance criterion, such as a predetermined threshold on discriminativeness for image quality, or other selection of the most highly ranked. This leaves a filtered visual attribute vocabulary 70 comprising a set of visual attributes that correlate well with the visual attribute scores and which can be extracted from a new image based on generic visual features alone.

The visual attribute vocabulary 70, classifiers 72 for each of the visual attributes in the vocabulary, and regression model 116 may be stored in memory for use at runtime. Once the visual attribute vocabulary 70 and classifiers 72 are generated, the text representation generator 80, aesthetic score computing component 82, text feature selector 84, and clustering component 86 are no longer needed and can be omitted from the system.

The online components 96, 98 100 of the system 12 are configured for interacting with the user via a graphical user interface (GUI) presented on the client device 50. Through the GUI, a user may select a query image 40 for processing by the system, e.g., from a user's collection stored in memory of the client device or stored in a remote memory. Or, the user may use the GUI to select a visual attribute or attributes 42 for retrieving images with that visual attribute from an image collection, such as the user's own collection of images or from a remote image collection, in which the images may have been previously processed by the system 12 to identify their visual attributes. The labeling component 96 labels an input query image 40 with visual attributes from the vocabulary 70. The labeling component may call on the visual feature-based representation generator 88 to generated a visual feature-based representation 76 of the image 40 and then employ the trained visual attribute classifiers 72 to classify the image 40 based on its representation 76. The visual attribute(s) which receive(s) the highest score(s) 74 are used as labels for the image 40. The labels may be output from the system 12 for display on the GUI. Images labeled by the system may also or alternatively be stored in a collection 120 of visual attribute-labeled images for later use.

The aesthetic score prediction component 98 receives the classifier scores 74 for the selected query image 40 and computes an aesthetic score for the test image based thereon, for example, using the regression model 116 (which may have been modified such that each visual attribute in the vocabulary 70 has a respective regression coefficient that may have been derived from the regression coefficients of its associated textual features).

The retrieval component 100 receives a selected visual attribute 42 from a user (e.g., selected from a menu presented to the user on the GUI via the client device display 46), such as the term "beautiful scene" and retrieves images from the visual attribute-labeled collection 120, based on the selected visual attribute(s). The user's query 40 or 42 may also include other constraints which further limit the images which are retrieved.

Information 44 responsive to the user's query 40 or 42 may be output, e.g., to the associated client device 50 or to a memory storage device and/or used in another computer-implemented process.

The computer system 12 may include one or more computing devices, such as a PC, such as a desktop, a laptop, palmtop computer, portable digital assistant (PDA), server computer, cellular telephone, tablet computer, pager, combination thereof, or other computing device capable of executing instructions for performing the exemplary method. In the illustrated embodiment, the computing device is illustrated as a server computer 102, which interacts with one or more client devices 50. As will be appreciated, some of the components illustrated as being resident on the server computer may be wholly or partly resident on the client computing device(s) or on another computing device.

The memory 20 may represent any type of non-transitory computer readable medium such as random access memory (RAM), read only memory (ROM), magnetic disk or tape, optical disk, flash memory, or holographic memory. In one embodiment, the memory 20 comprises a combination of random access memory and read only memory. In some embodiments, the processor 24 and memory 20 may be combined in a single chip. Memory 20 stores instructions for performing the exemplary method as well as the processed data. However, it is to be appreciated that separate memories may be employed. The network interface 26, 28 allows the computer to communicate with other devices via a computer network, such as a local area network (LAN) or wide area network (WAN), or the internet, and may comprise a modulator/demodulator (MODEM) a router, a cable, and/or Ethernet port. The digital processor 24 can be variously embodied, such as by a single-core processor, a dual-core processor (or more generally by a multiple-core processor), a digital processor and cooperating math coprocessor, a digital controller, or the like. The client devices 50 can be similarly configured to the server computer, in terms of hardware.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIGS. 2 and 3 represent a high level functional block diagram of only a portion of the components which are incorporated into a computer system 12. Since the configuration and operation of programmable computers are well known, they will not be described further.

Figure 4:
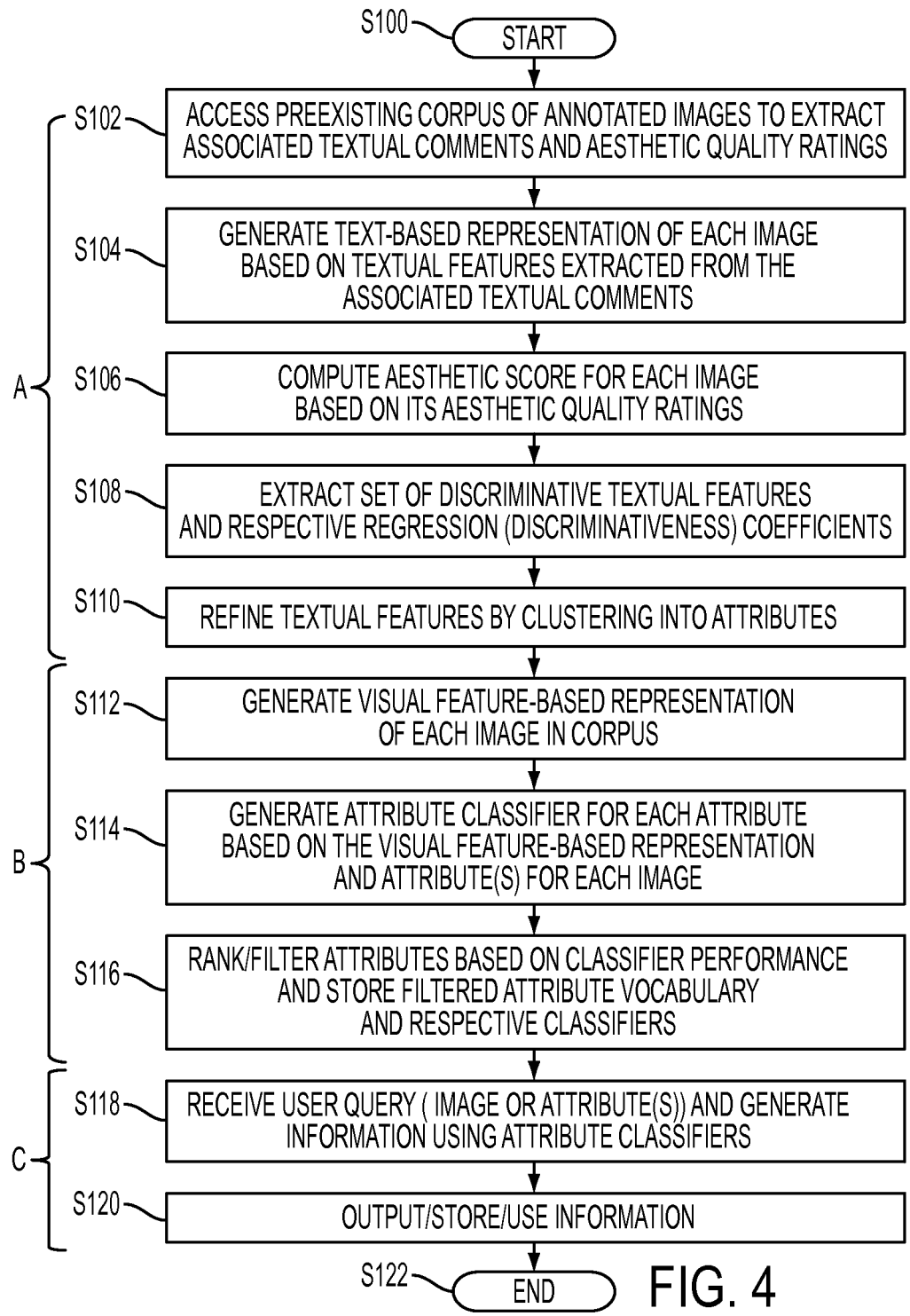
FIG. 4 is a flow chart illustrating a method for automatically learning (and using) visual attributes in accordance with another aspect of the exemplary embodiment.

With reference to FIG. 4, a method for learning visual attributes related to aesthetic quality of photographic images and for generating a representation of an image based on such visual attributes. The method can progressively refine an initial set of candidate visual attributes without the need of human intervention using a combination of visual and textual data.

The method begins at S100.

At S102, a collection 10 of labeled images is mined (by the text representation generator 80) to extract associated textual comments 64 and aesthetic quality ratings 62.

At S104, for each image 60 in the collection 10, a text-based representation 112 is generated (by the text representation generator 80) based on the extracted textual comments 64 associated with that image. The text based representation may include a feature vector, each feature in the feature vector having a value which is based on occurrences of single words or n-grams (where n is at least 2) in the extracted textual comments.

At S106, for each image 60 in the training corpus 10, an aesthetic score 114 is computed (by the aesthetic score computing component 82), which aggregates, e.g., averages, the aesthetic quality ratings assigned to the image.

At S108, a set of textual features (single words and/or n-grams) which are discriminative for the aesthetic scores of the images are identified (by the text feature selector 84). This may be performed, for example, using regression analysis to learn a regression model 116 comprising a set of regression coefficients. The learning aims to minimize, over all images in the training corpus 10, the error between a predicted score (generated by applying the regression model to at least a subset of the features in the text-based representation) and the actual aesthetic score computed at S106. The regression coefficients that are highest and lowest among the set of regression coefficients can be used to identify the corresponding textual features (which can be considered as candidate labels) that are most discriminative, and the other coefficients discarded.

At S110, the textual features identified at S108 may be refined, e.g., by clustering them, based on word similarity, to form a set of visual attribute clusters (with the clustering component 86, e.g., using spectral clustering). There may be a set of positive clusters and a set of negative clusters, the positive clusters each including one or more similar words/n-grams with positive regression coefficients (i.e., which are associated with higher aesthetic scores) and the negative clusters each including one or more similar words/n-grams with negative regression coefficients (i.e., which are associated with lower aesthetic scores). Each cluster is assigned one of the words/n-grams in that cluster as its name.

At S112, a visual feature-based representation 76 of each image in the corpus 10 is generated (by the visual feature-based representation generator 88) based solely on the content of the image, rather than on the associated metadata. This representation (e.g., a Fisher vector) may be a statistical representation of low level features extracted from multiple patches of the image.

At S114, a set of visual attribute classifiers (or a single multi-class classifier) is/are learned (by the classifier learning component 90) using, for each image in the collection, a visual attribute label and the corresponding visual representation 76. The visual attribute label can be based on the attribute representation 118, e.g., it can the respective value for that attribute cluster from the attribute representation 118, or may simply be a binary value generated by thresholding the cluster's value. In the case of training a multi-class classifier, the full cluster vectorial representation 118 may be used as the label.

At S116, the visual attributes are evaluated by testing the classifier(s) on a set of the images. The visual attributes (clusters) may be ranked (by the ranking component 92), based on the relative performance of their respective classifiers. Those visual attributes whose classifiers do not meet a threshold performance measure may be filtered from the set of visual attributes. This step tests the visual perceptibility of the visual attributes. For some applications, it is desirable to be able predict visual attributes (or attribute probabilities) for a given image, based on the visual feature-based representation for that image, using the learned classifiers. However, some classifiers do not perform with great accuracy and/or precision and thus it is not useful to retain these classifiers.

At S118, the remaining learned set of visual attributes and their classifiers 72 may be used for a variety of applications, such as:

1) extraction of visual attribute labels. Given a test image 40, the trained classifiers can be input with an extracted visual feature-based representation and labels assigned as a function of the visual attribute classifiers that fired for that image (using labeling component 96).

2) image tagging-the images 40 classified in 1) are automatically tagged with such visual attributes (using labeling component 96).

3) aesthetic prediction-outputting an aesthetic score for the test image 40, based on the extracted visual attribute labels and the learned regression model (using the aesthetic score prediction component 98).

4) image retrieval-based on an input visual attribute or attributes 42 (this assumes that images in a collection 120 have already been classified by the attribute classifiers 72 and labeled accordingly). Users may be asked to select the visual attribute(s) from a list of the cluster names (e.g., bigrams).

Other uses include computing similarity between images based on respective visual attribute scores output by the visual attribute classifiers 72. Any suitable similarity measure may be used, such as Euclidian distance, Manhattan distance, Earth mover's distance, or the like, between two vectors of attribute scores or the like.

At S120, information computed at S118 may be output, e.g., to an associated client device 50 or to a memory storage device or used in another computer-implemented process.

The method ends at S122.

The method illustrated in FIG. 4 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 102, (for example, an internal hard drive of RAM), or may be separate (for example, an external hard drive operatively connected with the computer 102), or may be separate and accessed via a digital data network such as a local area network (LAN) or the Internet (for example, as a redundant array of inexpensive of independent disks (RAID) or other network server storage that is indirectly accessed by the computer 102, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 4, can be used to implement the visual attribute learning/ using method. As will be appreciated, while the steps of the method may all be computer implemented, in some embodiments one or more of the steps may be at least partially performed manually. As will be appreciated, the steps of the method need not all proceed in the order illustrated and fewer, more, or different steps may be performed.

Further Details of the System and method will now be described.

Training Corpus

Images 60 from the corpus 10, and also the query images 40, may be received by the system in any convenient file format, such as JPEG, GIF, JBIG, BMP, TIFF, or the like or other common file format used for images and which may optionally be converted to another suitable format prior to processing. Input images may be stored in data memory during processing. The images may be individual images, such as photographs, or video images. In general, each input digital image 40, 60 includes image data for an array of pixels forming the image. The image data may include colorant values, such as grayscale values, for each of a set of color separations, such as L*a*b* or RGB, or be expressed in another other color space in which different colors can be represented. In general, "grayscale" refers to the optical density value of any single color channel, however expressed (L*a*b*, RGB, YcbCr, etc.). The word "color" is used to refer to any aspect of color which may be specified, including, but not limited to, absolute color values, such as hue, chroma, and lightness, and relative color values, such as differences in hue, chroma, and lightness. The method may also be used for black and white (monochrome) images.

An exemplary training corpus 10 is the AVA dataset (available on the www at dpchallenge.com), described in Murray 2012, which contains more than 250,000 images 60 accompanied by their aesthetic preference ratings 62 and textual comments 64 in natural language text. The AVA dataset contains 2.5 million textual comments, which provides a valuable resource of photographic knowledge aligned with the visual data. In this corpus, the photographs are organized into contests where images are submitted by users of the site and are ranked according to attractiveness ratings by other users (voters), who are often amateur photographers with a reasonable knowledge of photographic techniques. The contests are on a wide variety of topics. For example, one contest was entitled "Green Macro: Get up close and personal with the subject of your choice, using green as your primary color." Photographs that have been submitted can receive a rating from voters of 1-4, with 4 being the highest. While the images submitted for this particular contest generally contain a lot of green, the top-scoring ones can be observed to have brighter, more vivid green elements and the photographic technique "Macro" is much better represented, for example, showing insects at high magnification. In addition to the rating, voters can provide free text comments 64, which in the case of the Green Macro contest, included comments on the artistic composition and the photographic techniques used, such as the placement of the object of interest, colors, light, depth of field, perspective, and so forth. The results of more than 1,000 such contests are available on the site.

As an example of the content of the AVA dataset, Table 1 provides statistics on the comments received.

TABLE 1

Statistics on comments in AVA dataset

| Statistic | During challenge | After challenge | Overall |
|---|---|---|---|
| comments per image ($\mu$ and $\sigma$) | 9.99 (8.41) | 1.49 (4.77) | 11.49 (11.12) |
| words per comment ($\mu$ and $\sigma$) | 16.10 (8.24) | 43.51 (61.74) | 18.12 (11.55) |

On average, an image tends to have about 11 comments, with a comment having about 18 words on average. As the statistics in columns 2 and 3 demonstrate, however, commenting behavior is quite different during and after challenges. As can be seen, users tend to comment mainly when the photographic challenge is taking place, but on average they tend to leave longer comments when the challenge is over. For some applications, one or both of these groups of comments may be selected. In the examples below, all the comments were used.

Figure 5:
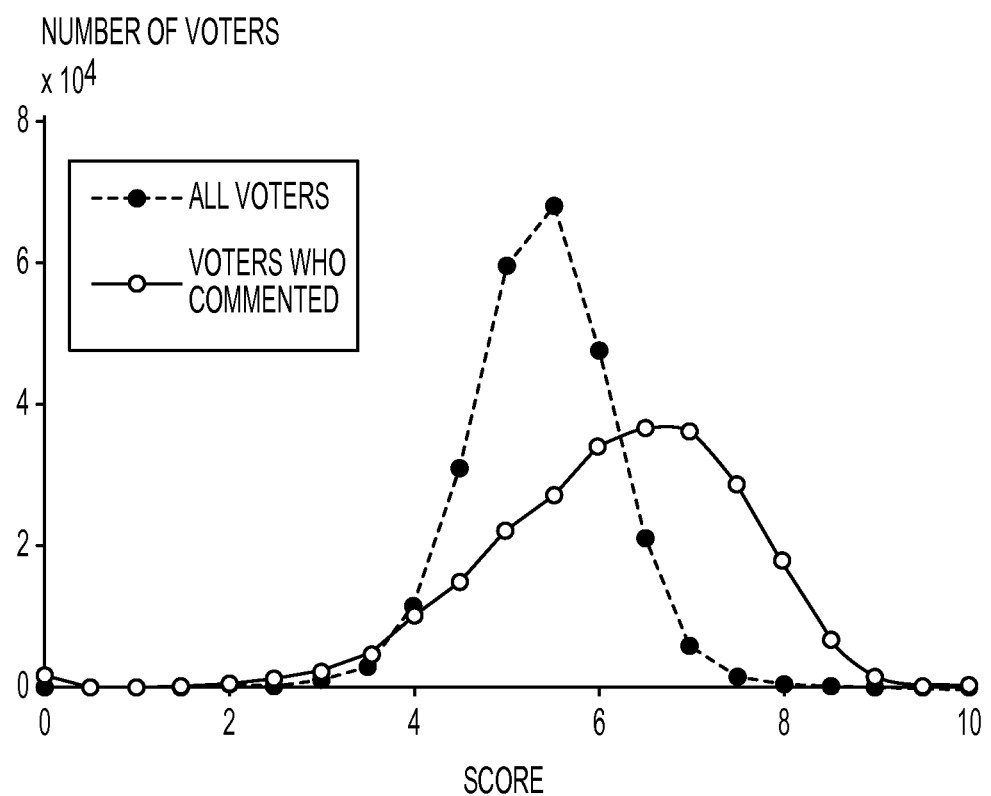
FIG. 5 is a plot showing a distribution of aesthetic scores by a population of annotators illustrating that the aesthetic scores are influenced by whether or not the annotator provided textual comments.

The attractiveness ratings 62 given to the images by the users of dpchallenge.com also showed variations depending on whether they left a comment or not. FIG. 5 compares the distribution of votes for all images in the AVA dataset (dotted line) with that for votes accompanied by a comment (unbroken line). Voters seem to be more generous, on average, when commenting on the photos. The distribution also has a higher variance which may imply higher noise or higher divergence of opinion.

In some embodiments, the population of voters that left a comment (commentators) can be identified and only the votes of voters that left a comment may be used for computing the aesthetic score (S106). However, this may leave a relatively small pool of ratings from which to compute attractiveness scores. Accordingly, in the exemplary embodiment, all attractiveness ratings are used, irrespective of whether they are associated with a comment of the same voter.

Generation of the Text-Based Representation (S104)

In general, the visual attributes useful herein represent a class-discriminative, but not necessarily class-specific property that both computers and humans can decide on (following D. Parikh and K. Grauman, "Relative attributes," ICCV 2011). This implies that visual attributes should be understandable by humans. To enforce interpretability, the visual attributes are acquired from natural text corpora. In the present case, the user comments 64 of the AVA dataset 10 may be used as a textual resource, since they contain very rich information about aesthetics. However, such comments are individually quite noisy: they can be very short and they are often written in a spontaneous manner. To address these problems, the textual comment data is preprocessed prior to visual attribute discovery.

Generation of Text-Based Representation (S104)

In a preprocessing step, all the comments 64 related to a single image 60 are merged into a single textual document 110. Merging the generally very short and noisy comments averages noise and thus leads to a more robust representation. In the exemplary embodiment, the text of the document 110 is first tokenized to identify words. A spell-check may be performed on the document to remove and/or correct spellings of incorrectly spelled/unidentified words. Stop-words (which occur very frequently throughout the document corpus, such as determiners, e.g., "the" and "a", and prepositions) as well as numbers are removed. A statistical representation 112 of the document 110, based on the remaining words, is then generated. For example, each document 110 is represented as a bag-of-words (BOW) histogram using the term frequency-inverse document frequency weighting (tf-idf) (see, for example, U.S. Pat. No. 8,386,574, incorporated by reference, for details of this computation). In this embodiment, each commented-upon image is associated with a bag-of-words vector with each feature in the vector representing the frequency of occurrence of a respective word found in the set of processed documents 110 which have been generated for all the images.

In another embodiment, rather than using single words (unigrams), higher order n-grams may be used, where n is at least 2, such as bigrams (n=2). Thus for example, in the case of bigrams, each sequential pair of words in each preprocessed document is extracted. The extraction of the bigrams may also take into account the relatedness e.g., two words from a bigram must come from the same comment and from the same sentence in the comment where the comment includes more than one sentence.

Thus for example, given three comments:
1. This has great colors and positioning.
2. I love the colors. It is very well done, and
3. An awesome shot of the flowers. Nice colors!

an illustrative document 110 as shown in FIG. 3 may be derived from these comments. After removal of stop words (using a predefined list of stop words, such as the, and, etc.) the following bigrams could be extracted: "great colors," "colors positioning", "love colors," "very well," "well done," "awesome shot," "shot flowers" and "nice colors." In this embodiment, bigrams are extracted at the sentence level, i.e., a bigram cannot span two sentences or two different comments, although it is also contemplated that the entire text document, after removal of punctuation and stop words, can be considered as a single sequence from which all pairs of words are extracted, i.e., $$\frac{S}{2} - 1$$

bigrams, where S is the number of words in the sequence. As for the unigram case, a statistical representation 112 of the bigrams in each text document can be generated, for example, using the term frequency-inverse document frequency weighting (tf-idf), based on the set of bigrams found in all the documents 110. This bigram-based statistical representation can be much lower in dimensionality than in the case of unigrams.

Supervised Discovery of Visual Attributes (S108, S110)

While an unsupervised approach is also contemplated, in the exemplary embodiment, the attractiveness scores generated at S106 are used as supervisory information to mitigate the noise of textual labels. The use of the attractiveness scores assists in identifying interpretable textual features that are highly correlated with aesthetic preference.

1. Selecting Discriminative Textual Features (S108)

In S108 regression coefficients are learned. In the exemplary embodiment, two (or more) categories of visual attributes, e.g., "beautiful" and "ugly" visual attributes, are mined by discovering which of the textual features identified at S104 can predict the aesthetic score of an image and whether they correlate positively or negatively with the aesthetic score. This may be performed by regression analysis. In one embodiment, an Elastic Net is trained with the textual features. For details on the Elastic Net, see, for example, Hui Zou and Trevor Hastie, "Regularization and variable selection via the elastic net," J. Royal Statistical Society, 2005, pp. 301-320, hereinafter, Zou 2005. This is a regularized regression method that combines an $l_2$-norm and a sparsity-inducing $l_1$-norm.

In the following, the terms "optimization," "minimization," and similar phraseology are to be broadly construed as one of ordinary skill in the art would understand these terms. For example, these terms are not to be construed as being limited to the absolute global optimum value, absolute global minimum, and so forth. For example, minimization of a function may employ an iterative minimization algorithm that terminates at a stopping criterion before an absolute minimum is reached. It is also contemplated for the optimum or minimum value to be a local optimum or local minimum value.

Let N be the number of textual documents 110. Let D be the dimensionality of the bag-of-word (or bag-of-bigram) histograms. Let X be the N×D matrix of documents. Let y be the N×1 vector of scores 114 of aesthetic preference (for example, the score y of an image in vector y is the average of the ratings it receives). Then, a regression model β can be learned which minimizes, over at least a set of the images 60 in the training corpus 10, the quadratic error between the predicted score xβ and the actual score y, where x is D-dimensional vector for one document in X, optionally using one or more regularization parameters to mitigate overfitting. For example, the regression model β which optimizes Eqn. 1, or a function thereof, can be determined.

$$\hat{\beta} = \mathrm{argmin}_\beta \|y - X\beta\|^2 + \lambda_1 \|\beta\|_1 + \lambda_2 \|\beta\|_2^2 \quad (1)$$

where $\lambda_1$ and $\lambda_2$ are non-zero regularization parameters is the norm of β and $\|\beta\|_2$ is the $l_2$-norm of β. This is similar to a ridge regression function (there, $\lambda_1$ would be 0). The regression model β is a D-dimensional vector, which can be reduced in dimensionality to include only the most discriminative coefficients (most positive and most negative) such as at least 50 and up to 2000 coefficients, e.g., less than 1000 coefficients. The text features corresponding to these coefficients are retained.

In one embodiment, the vocabulary of unigrams extracted from the documents 110 can be used simply to cross validate the regularization parameters. For example, different values of $\lambda_1$ and $\lambda_2$ can be selected and the values which optimize the regression function (Eqn. 1) are retained. Then, bigrams are used for the remainder of the method.

As an example, an experiment was performed with a vocabulary D of about 30,000 unigrams and the regularization parameters were cross-validated using this set. The best regression results were obtained with about 1500 non-zero coefficients for β. The candidate labels (unigrams and bigrams) were then analyzed by sorting them according to $\|\beta\|$ (see Table 2) to check their interpretability.

TABLE 2

Most discriminant unigrams and bigrams with their regression coefficient from β

| | Terms (regression coefficient in β) |
|---|---|
| UNIGRAMS+ | great (0.4351), like (0.3301), excellent (0.2943), love (0.2911), beautiful (0.2704), done (0.2609), very (0.2515), well (0.2465), shot (0.2228), congratulations (0.2223), perfect(0.2142), congrats (0.2114), wonderful (0.2099), nice (0.1984), wow (0.1942), one (0.1664), top (0.1651), good (0.1639), awesome (0.1636), |
| UNIGRAMS− | sorry (−0.2767), focus (−0.2345), blurry (−0.2066), small (−0.1950), not (−0.1947), don (−0.1881), doesn (−0.1651), ash (−0.1326), snapshot (−0.1292), too (−0.1263), grainy (−0.1176), meet (−0.1122), out (−0.1054), try (−0.1041), low (−0.1013), poor (−0.0978), . . . , distracting (−0.0724), |
| BIGRAMS+ | well done (0.6198), very nice (0.6073), great shot (0.5706), very good (0.3479), great job (0.3287), your top (0.3262), my favorites (0.3207), top quality (0.3198), great capture (0.3051), lovely composition (0.3014), my top (0.2942), nice shot (0.2360), th placing (0.2330), great lighting (0.2302), great color (0.2245), excellent shot (0.2221), good work (0.2218), well executed (0.2069), great composition (0.2047), my only (0.2032), awesome shot (0.2030), |
| BIGRAMS− | too small (−0.3447), too blurry (−0.3237), not very (−0.3007), does not (−0.2917), not meet (−0.2697), wrong challenge (−0.2561), better focus (−0.2280), not really (−0.2279), sorry but (−0.2106), really see (−0.2103), poor focus (−0.2068), too out (−0.2055), keep trying (−0.2026), see any (−0.2021), not sure (−0.2017), too dark (−0.2007), next time (−0.1865), missing something (-0.1862), just don (−0.1857), not seeing (−0.1785), your camera (−0.1775) |

The apparent typographical errors in Table 2, such as don and doesn are the result of the automatic preprocessing operations applied, such as stemming and filtering.

By inspecting the most discriminant unigrams, it can be seen that the ones at the top of each group relate to specific visual attributes (e.g., grainy, blurry). But others can be ambiguous (e.g. not, doesn't, poor) and interpreting them is rather hard. These nuances of the language can be resolved by looking at n-grams (where n is an integer greater than 1) and especially at bigrams (n=2).

Bigrams can capture non-compositional meanings that a simpler feature does not. Bigrams are in general more interpretable than unigrams since they can capture the polarity of comments. For example, the word "lighting" does not have an intrinsic polarity while a bigram composed by "great" and "lighting" can successfully disambiguate the meaning. Hence, in the Examples below, regression on a set of D=90,000 bi-grams was performed using Eqn. 1. The same regularization parameters identified in the unigram case were used with the set of bigrams.

As can be seen from Table 2, those bigrams which receive the highest/lowest regression coefficients can be selected as useful textual features. The regression coefficients implicitly select those textual features as the most discriminant ones for predicting attractiveness. The highest coefficients (most positive) correspond to "beautiful" visual attributes while the lowest coefficients (most negative) correspond to "ugly" visual attributes. As an example, a subset of about 1500 bigrams is selected from the positive set and another subset of about 1500 is selected from the negative set to provide a representative set of terms that have the highest (resp. lowest) coefficients.

While the exemplary method uses an Elastic Net, it is also contemplated that other sparsity-inducing norms like LASSO (see, Robert Tibshirani, "Regression shrinkage and selection via the lasso," Journal of the Royal Statistical Society. Series B (Methodological), pages 267-288, 1996, could be used. However, some of these other methods have limitations in feature selection tasks. For example, if there is a group of features among which the pairwise correlations are very high, then the LASSO technique tends to select only one random feature from the group (Zou, 2005). In the present case, LASSO produces a compact vocabulary of uncorrelated visual attribute labels, but also a very small number of labeled images. This is problematic because it is advantageous to have as many annotated images as possible at a later stage to train one visual classifier for each visual attribute. The Elastic Net thus provides a useful compromise.

2. Clustering Terms (e.g., Bigrams) (S110)

The effect of the Elastic Net on correlated features can be noticed by looking at Table 2. As expected, the Elastic Net tolerates correlated features (synonym bigrams) such "well done" or "very nice", "beautiful colors" and "great colors." This greatly augments the number of annotated images, but the method then entails handling synonyms in the vocabulary of visual attributes. For this reason, the list of 3,000 candidate bigrams (1,500 for Beautiful visual attributes and 1,500 for Ugly visual attributes) may be made more compact by clustering the terms. In the exemplary method, this is performed with Spectral Clustering, although other clustering techniques are also contemplated (for details on spectral clustering, see, for example, Andrew Y. Ng, et al. "On spectral clustering: Analysis and an algorithm," NIPS, 2002, pp. 849-856). The beautiful and ugly bigrams are clustered separately. The number of clusters may be set to a suitable number (such as at least 100). In one embodiment 200 clusters are used (100 Beautiful and 100 Ugly clusters). Similarity matrices are created by computing a measure of bigram similarity among the second term within each bigram (discarding the first term). This approach is based on the expectation that bigrams are often composed by a first term which indicates the polarity and a second term which describes the visual attributes e.g., "lovely composition," "too dark," "poor focus." One suitable measure of bigram similarity is the Levenshtein distance, which counts the number of changes needed to convert one word to another, such as additions, deletions, reordering of letters, etc. For example, given the two textual features "great colour" and great colors," the distance between colour and colors is computed as one deletion of a letter plus one addition of a letter=2. In this method, a lower number indicates higher similarity. In other embodiments a thesaurus or other resource may be used to identify similar words that have the same meaning (as in colour vs. color) or a similar meaning (such as singular vs. plural of the same word, e.g. color and colors).

The exemplary method yields an almost duplicate-free set of visual attributes, and a richer set of images associated with them. Some sample clusters generated using spectral clustering (K=100 for positive and 100 for negative) of the 3000 bigrams obtained from the AVA dataset are shown below:

C1: ['beautiful', 'colors'] ['great', 'colors'] ['great', 'colours'] ['nice', 'colors']

C2: ['absolutely', 'love'] ['just', 'love'] ['really', 'love'] ['would', 'love']

C3: ['challenge', 'perfectly'] ['just', 'perfect']

C4: ['action', 'shot'] ['amazing', 'shot'] ['awesome', 'shot'] ['beautiful', 'shot'] ['cool', 'shot'] ['excellent', 'shot'] ['fantastic', 'shot'] ['gorgeous', 'shot'] ['great', 'shot'] ['lovely', 'shot'] ['nice', 'shot']

C5: ['nicely', 'captured'] ['well', 'captured'] ['you', 'captured']

C6: ['excellent', 'detail'] ['great', 'detail'] ['nice', 'detail']).

A bigram can be randomly drawn, or otherwise automatically selected, from each cluster to name the corresponding visual attribute. For example, the label for C1 may be Beautiful Colors.

Each image in the image database 10 can then be described by a visual attribute representation 118. The visual attribute representation can be based on the visual attribute clusters that include one or more of the textual features (e.g., bigrams) extracted from the corresponding text document 110. The visual attribute representations could reflect simply the visual attribute clusters that fire, or take into account the number of occurrences, and optionally be normalized to account for the number of word or text features in the document. For example, for the six clusters exemplified above, the text document in FIG. 1 could be represented as (2, 0, 0, 1, 0, 0), which may be normalized, e.g., such that the values in each vector sum to 1: (0.67, 0, 0, 0.33, 0, 0).

To validate the relevance of the discovered visual attributes, they were used together with the learned regressors $\hat{\beta}$ to predict aesthetic preference scores from textual comments. Spearman's $\rho$ score was used to measure the correlation between the ground truth image ranking (deduced from the attractiveness scores) and the predicted ranking. A value of 0.821 was obtained. These results can be compared to the baseline of San Pedro, T. Yeh, and N. Oliver, "Leveraging user comments for aesthetic aware image search reranking," Proc. $21^{st}$ Intern'l Conf. on World Wide Web (WWW), pp. 439-448 2012, which relies on features specifically designed to capture opinions in comments. They report a score of 0.584 which is significantly lower. This indicates that the exemplary learned visual attributes can be used to predict attractiveness, thus validating their usefulness for this task.

Learning the Visual Appearance of Visual Attributes (S112, S114, S116)

For a total of about 200 visual attributes in the vocabulary 70, it may be time consuming to manually design a different visual classifier for each visual attribute. Therefore, in one embodiment, the visual attribute classifiers 72 are learned from generic features. Attribute classifiers 72 can be readily learned using, for example some or all of the images available in the AVA dataset (approx. 200,000) using generic features extracted from each image. The visual attributes are then ranked based on visual perceptiveness (S116).

1. Generating Visual Representations of Images (S112)

As the visual feature-based image representation 76, any suitable representation of the image based on the pixels of the image can be used.

A suitable statistical representation 76 is based on low-level image features such as shape, gradient (e.g., SIFT), and/or color features extracted from patches of the image.

See, D. G. Lowe, "Object recognition from local scale-invariant features," ICCV, vol. 2 pp. 1150-1157 (1999), for a description of SIFT features.

The patches can be obtained by image segmentation, by applying specific interest point detectors, by considering a regular grid, or simply by random sampling of image patches. Each patch includes a plurality of pixels and may include, for example, at least 16 or at least 64 or at least 100 pixels. There may be at least 40 or at least 100 patches extracted from the image. The extracted low level features (such as vectors) from each patch can be concatenated to form a features vector which serves as the visual representation 76. In other approaches, the feature vectors of an image are assigned to clusters. For example, a visual vocabulary is previously obtained by clustering low-level features extracted from training images, using for instance K-means. Each patch vector is then assigned to a nearest cluster and a histogram of the assignments can be generated. In other approaches, a probabilistic framework is employed. For example, it is assumed that there exists an underlying generative model, such as a Gaussian Mixture Model (GMM), from which all the vectors are emitted. In this case, the visual vocabulary can be estimated using the Expectation-Maximization (EM) algorithm. In either case, each visual word in the vocabulary corresponds to a grouping of typical low-level features. The visual words may each correspond (approximately) to a mid-level image feature such as a type of visual (rather than digital) object (e.g., ball or sphere, rod or shaft, etc.), characteristic background (e.g., starlit sky, blue sky, grass field, etc.), or the like. Given an image 40, 60 to be assigned a representation 76, each extracted feature vector is assigned to its closest visual word in the previously trained vocabulary or to all visual words in a probabilistic manner in the case of a stochastic model.

In some embodiments, the image is divided into regions, each comprising a set of patches. A region representation is computed, as above, and the representations for each region are aggregated to form an overall image representation. For example one region may be the entire image (1×1) which can be subdivided into 4 regions (2×2) each one quarter of the size of the image, and subdivided into 3 regions (1×3), each one third of the original image, the vertical direction. This is referred to as a spatial pyramid.

An exemplary visual representation 76 which relies on the underlying generative model is the Fisher vector. See, e.g., Perronnin, et al., "Fisher kernels on visual vocabularies for image categorization" in CVPR (2007). Methods for computing Fisher vectors are more fully described US Pub. No. 20120076401, published Mar. 29, 2012, entitled IMAGE CLASSIFICATION EMPLOYING IMAGE VECTORS COMPRESSED USING VECTOR QUANTIZATION, by Jorge Sanchez, et al., US Pub. No. 20120045134, published Feb. 23, 2012, entitled LARGE SCALE IMAGE CLASSIFICATION, by Florent Perronnin, et al., and in Jorge Sanchez, and Thomas Mensink, "Improving the fisher kernel for large-scale image classification," in Proc. 11$^{th}$ European Conference on Computer Vision (ECCV): Part IV, pages 143-156 (2010), and in Jorge Sanchez and Florent Perronnin, "High-dimensional signature compression for large-scale image classification," in CVPR 2011, the disclosures of which are incorporated herein by reference in their entireties. The trained GMM is intended to describe the content of any image within a range of interest (for example, any color photograph if the range of interest is color photographs).

Another suitable representation is referred to as the bag-of-visual words, See for example, U.S. Pub. Nos. 20080069456 and 20110091105, entitled BAGS OF VISUAL CONTEXT-DEPENDENT WORDS FOR GENERIC VISUAL CATEGORIZATION, by Florent Perronnin; Gabriela Csurka, et al., "Visual Categorization with Bags of Keypoints," European Conf. on Computer Vision (ECCV) Workshop on Statistical Learning in Computer Vision (2004); and Perronnin, F., Dance, C., Csurka, G., and Bressan, M., "Adapted Vocabularies for Generic Visual Categorization," in ECCV 2006.

The following references also describe methods for generating visual feature-based representations (often referred to as image signatures) for visual classification: U.S. Pub. Nos. 20030021481; 2007005356; 20070258648; 20080069456; 20080240572; 20080317358; 20090144033; 20090208118; 20100040285; 20100082615; 20100092084; 20100098343; 20100189354; 20100191743; 20100226564; 20100318477; 20110026831; 20110040711; 20110052063; 20110072012; 20110091105; 20110137898; 20110184950; 20120045134; 20120076401; 20120143853; 20120158739; 20120163715, 20130182909 and the disclosures of which are incorporated herein by reference.

As an example, 128-dimensional SIFT (gradient) and 96-dimensional color descriptors are extracted from 24×24 patches on dense grids every 4 pixels at 5 different scales. A three-level spatial pyramid (1×1, 2×2, 1×3) is used. The dimensionality of the patch vectors is reduced to 64-dimensions using PCA. These low-level descriptors are aggregated into an image-level representation using the Fisher Vector. Visual vocabularies of 64 Gaussians are used. One SIFT and one color FV are computed per image and concatenated. This leads to a combined 131,072-dimension representation which is PQ-compressed to reduce the memory footprint and to enable keeping all image representations in RAM. See H. Jegou, M. Douze, and C. Schmid, "Product quantization for nearest neighbor search," IEEE TPAMI, January 2011 (vol. 33 no. 1) pp. 117-128 for a discussion of this compression method.

2. Training the Classifiers (S114)

Once the visual feature-based image representation 76 and the visual attribute representation 118 have been generated for each image 60, linear classifiers are learned, one for each visual attribute, using any suitable classifier learning method. As an example, the classifiers are learned using a regularized logistic regression objective function and Stochastic Gradient Descent (SGD) learning. See, for example, L. Bottou and O. Bousquet, "The tradeoffs of large scale learning," Advances in Neural Information Processing Systems (NIPS) 2007, pp. 161-168. Using a logistic loss (rather than a hinge loss for example) provides a probabilistic interpretation of the classification scores, which is a desirable property for training visual attributes.

By experimenting with several features configurations during the generation of the visual representations, it was found that color features were particularly useful for the classification of visual attributes. This is not surprising since many visual attributes are indeed color names or color properties. It was also found that 64 Gaussians is a reasonable trade-off between precision and computational complexity of the features used.

The performances of two learning approaches were compared: 1-vs-rest against multi-class classifier. The former strategy provided better results experimentally.

Given an input image representation for a query image, the trained classifiers 72 each output a probability for the respective visual attribute, which can be converted to a binary decision by thresholding the probability.

3. Ranking the Visual Attributes (S116)

Figure 6:
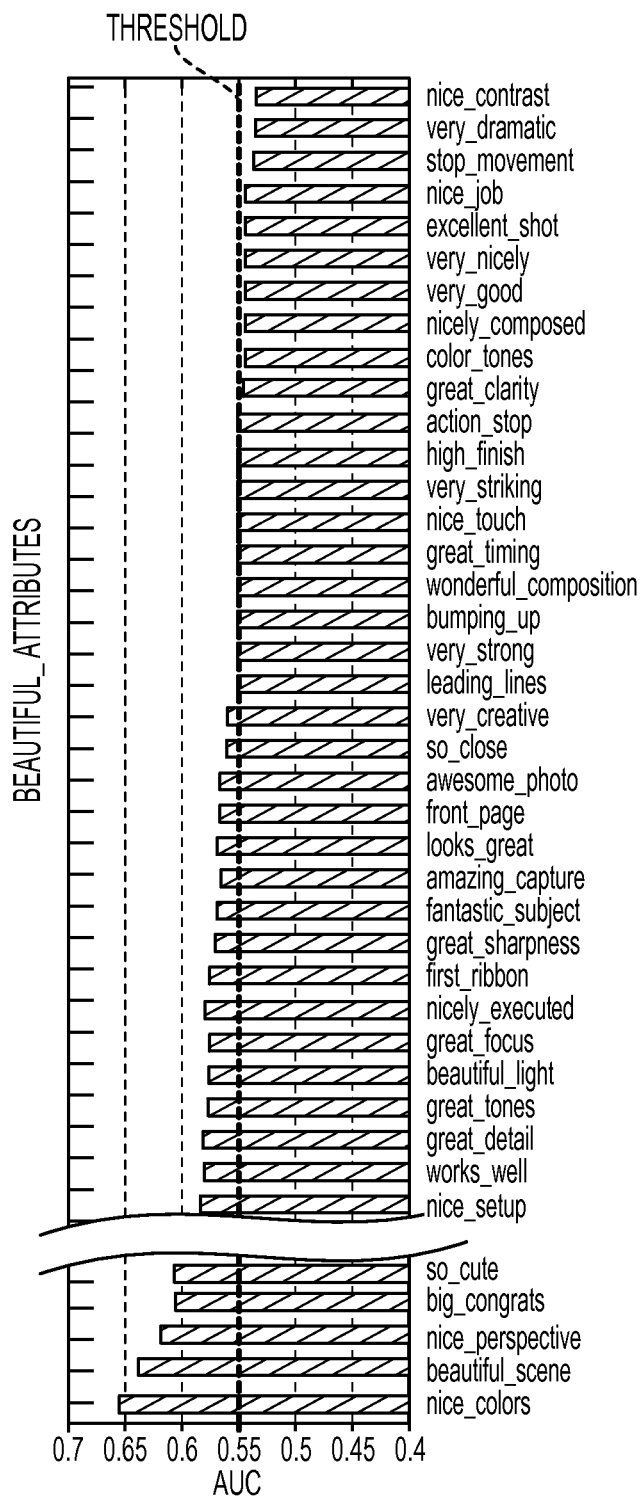
FIG. 6 illustrates the discriminative performance of classifiers for "beautiful" attributes (that are positively associated with aesthetic scores), ranked according to area under the curve (AUC)

Interpretability and discriminability of the visual attribute labels have been enforced in the previous steps, using attractiveness scores as a supervision mechanism. However, this does not ensure that all these visual attributes can be recognized by a computer. Accordingly, the performance of the trained classifiers 72 is evaluated in terms of their visual perceptiveness. This can be performed using the Area Under the ROC Curve (AUC) calculated for each individual visual attribute and then ranking the visual attributes by the performance. As an example, FIGS. 5 and 6 show the AUC (classifier performance) calculated for the top 50 Beautiful visual attributes and Ugly visual attributes, respectively, where some of the visual attributes in each set are omitted for brevity. A higher AUC corresponds to higher classifier performance.

From these plots, it would appear that beautiful visual attributes are easier to learn than ugly visual attributes. However, the ugly visual attributes were trained with fewer images: people prefer to comment on high quality images and, as a consequence, fewer ugly visual attribute labels were discovered. It is also apparent that visual attributes which detect lighting conditions and colors (e.g., too dark, great color, too harsh) are in general easier to learn. Often, more complex visual concepts, such as interesting idea, bit distracting, very dramatic have lower performances.

To ensure that the classifier outputs are meaningful, the highest ranking visual attributes, according to the performance measure, can be selected. In the illustrated example, a threshold AUC of 0.55 was established and visual attributes whose classifiers which did not meet the threshold were discarded from the vocabulary 70. However another suitable threshold could be selected as the cutoff or simply the top n highest ranking visual attributes in each category (beautiful or ugly) are selected, where n can be at least 5, or at least 10, or at least 20, for example.

scores for 100 beautiful visual attributes and 100 ugly visual attributes. The visual attribute vector is fed to a regression function of the form:

βx=Aesthetic preference prediction, which can be turned into a binary output (ugly or beautiful) by thresholding.

Figure 7:
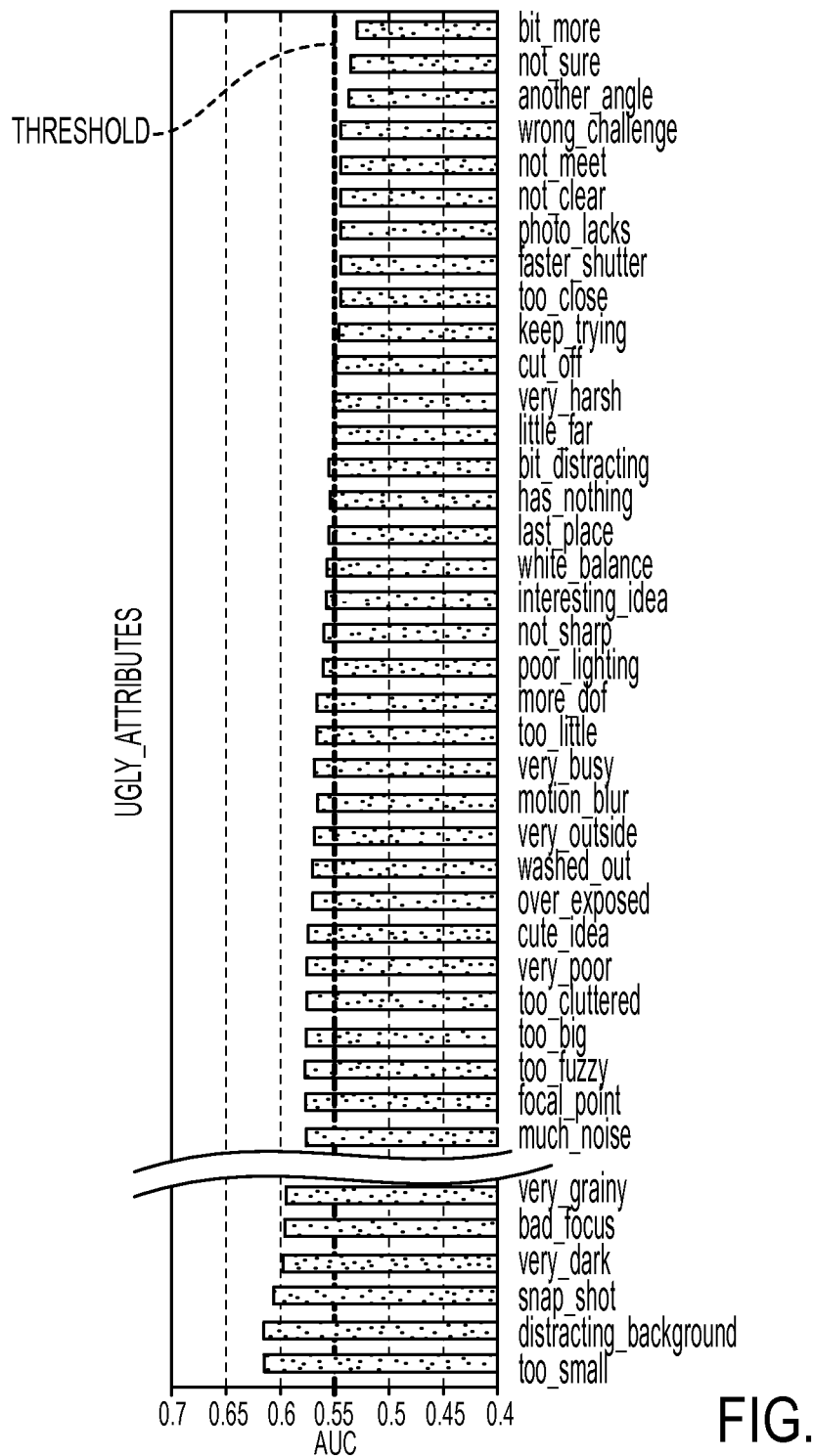
FIG. 7 illustrates the discriminative performance of classifiers for "ugly" attributes (that are negatively associated with aesthetic scores), ranked according to area under the curve (AUC)
Figure 8:
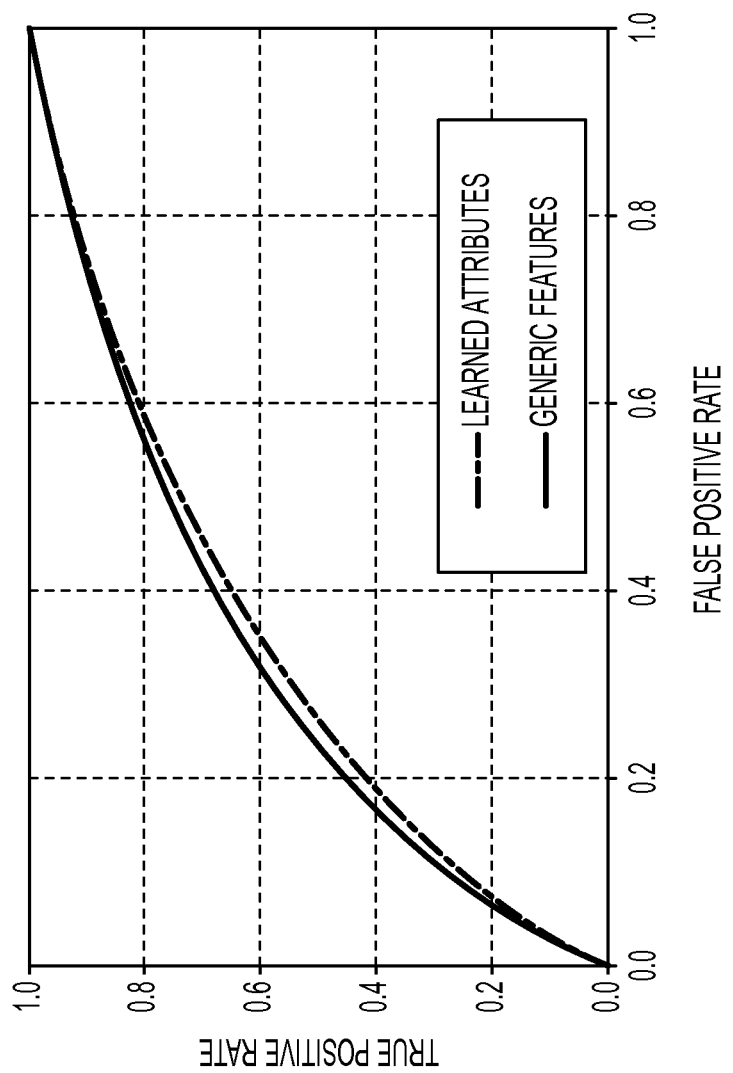
FIG. 8 shows Receiver Operating Characteristic (ROC) curves for aesthetic preference prediction showing a comparison between learned visual attributes and generic features.

This approach can be compared to the approach in Marchesotti 2011, which is based on generic image features. To make the comparison with Marchesotti 2011, the same Fisher Vector generic features in were employed. As it can be seen in FIG. 7, visual attributes perform comparably to low-level features for predicting aesthetic scores, despite the significant difference in dimensionality (131,072 dimensions for the low-level features and 200 dimensions for the visual attributes). The small price paid in performance (AUC from 0.715 to 0.704) is compensated for by having the option to replace or supplement a single image attractiveness label (e.g., "ugly" or "beautiful") with the labels of the most responsive visual attributes. This is advantageous because a list of visual attribute labels associated with the most responsive visual attribute classifiers can help to explain why the image is predicted to be beautiful or ugly.

2. Auto-Tagging

In some cases, tagging an image as beautiful or ugly (a binary decision) can be too aggressive for a subjective problem such as aesthetic quality. It could form a positive or negative prior in the user's mind in contradiction with his or her tastes and opinions. In the present case, in addition to predicting aesthetic quality (is this image a beautiful or ugly?) a qualitative description may be generated of the aesthetic properties of an image in terms of beautiful/ugly visual attributes.

As can be seen from the examples of Table 3, this strategy gives to the user a higher degree of interpretation of the aesthetic quality. The actual images are not shown in the Table, which is for illustrative purposes only.

TABLE 3

Example images and their score-based classifications and relevant labels

| Image | Image 1 | Image 2 | Image 3 | Image 4 |
|---|---|---|---|---|
| Overall Decision | Beautiful | Beautiful | Ugly | Ugly |
| Labels of high scoring visual attributes | great_macro, very_pretty, great_focus, nice_detail, so_cute | great_capture, great_angle, nice_perspective, lovely_photo, nice_detail | more_dof, not_sure, too_busy, motion_blur, blown_out | soft_focus, not_sure, more_light, sharper_focus, more_dof |

The classifiers 72 for the remaining visual attributes are retained and may be stored in memory for use when a query is received and/or used to classify a set of images forming a collection 120.

Applications (S118)

The learned visual attributes and their classifiers have a variety of applications. Three applications of the visual attributes are described by way of example:

1. Aesthetic Prediction

In some cases, a user may be interested in having a binary answer regarding the attractiveness of an image: beautiful vs. ugly. The learned visual attributes can be used to make such a prediction.

As an example, the Fisher Vector computed for an image is input to the visual attribute classifiers and a 200 dimension visual attribute vector x is generated based on the classifier With clearly interpretable visual attributes such as "more light," "more depth field of view", and "not sure," the user is assisted in forming his/her own opinion.

3. Image Retrieval

The learned visual attributes can be used to perform visual attribute-based image retrieval. In an evaluation using the AVA database, for six different queries, a single visual attribute selected from the list of Beautiful and Ugly visual attributes identified in the method was used as the input and the top-returned results were displayed. It was observed that the images clearly explain the labels, even for fairly complex visual attributes such as "too busy", "blown out", "white balance" (three of the Ugly visual attributes). In the case of the visual attribute "nice perspective" the retrieved images tend to be of buildings. This semantic bias could be reduced by designing learning strategies that take into account semantic labels (which are also present in the AVA dataset).

The method may find application in a variety of applications, such as the photofinishing business (printing of photo albums, calendars, etc.), in the creation of marketing materials (brochures, calendars, websites), and the like.

The results obtained for a relatively small-scale dataset (only 250,000 images) can be extended to larger-scale corpora, if available.

The method preserves the advantages of generic features while generating interpretable results. The method allows discovering and learning visual attributes automatically, which is a cost-effective alternative to hand-listing visual attributes and to architectures which require human participation.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for learning visual attribute labels for images comprising:
   from textual comments associated with a corpus of images, identifying a set of candidate textual labels that are predictive of aesthetic scores associated with images in the corpus;
   clustering the candidate labels in the set into a plurality of visual attribute clusters based on similarity and assigning each of the clusters a visual attribute label;
   for each of the visual attribute labels, training a visual attribute classifier using visual representations of images in the corpus and respective visual attribute labels;
   evaluating the visual attribute labels based on performance of the trained visual attribute classifiers, the evaluating comprising comparing performance of each of the visual attribute classifiers with a predefined threshold; and
   retaining a subset of the visual attribute labels based on the evaluation, including retaining the visual attribute labels for the visual attribute classifiers that meet the performance threshold;
   wherein at least one of the identifying a set of candidate textual labels, clustering the candidate labels, training the classifier, and evaluating the classifier performance is performed with a processor.

2. The method of claim 1, wherein the identifying of the set of candidate textual labels comprises, for each image, generating a text-based representation of a set of textual features from which the candidate labels are selected.

3. The method of claim 2, wherein the text-based representation of the image is based on the textual features extracted from textual comments associated with the image.

4. The method of claim 3, wherein the identifying of the set of candidate textual labels comprises, for each image in the corpus, generating a document based on textual comments associated with the image in which stop words and punctuation have been removed to generate a sequence of words, and from the sequence of words, extracting a set of textual features, the text-based representation being based on occurrence of the textual features in the document.

5. The method of claim 2, wherein each of the textual features in the text-based representation corresponds to a respective sequence of at least one word extracted from the textual comments associated with the corpus of images.

6. The method of claim 5, wherein at least some of the textual features represented in the text-based representation each correspond to a bigram.

7. The method of claim 2, wherein the identifying of the set of candidate textual labels comprises:
   optimizing a regression function that outputs a regression coefficient for each the textual features represented in the text-based representation; and
   ranking at least some of the textual features based on the regression coefficients.

8. The method of claim 7, wherein the regression function is an Elastic Net.

9. The method of claim 1, wherein the assigning each of the clusters a visual attribute label comprises selecting one of the textual features assigned to the cluster as the visual attribute label.

10. The method of claim 1, wherein each of the visual representations comprises a statistical representation of low level features extracted from patches of the respective image.

11. The method of claim 1, further comprising, with the trained classifiers, assigning visual attribute labels to a query image based on a visual representation of the query image.

12. The method of claim 1, further comprising receiving one of the retained visual attribute labels as a query and retrieving images from a collection of images that are labeled with visual attribute labels selected from the set of visual attribute labels.

13. A computer program product comprising a non-transitory storage medium which stores instructions, which when executed by a computer, performs the method of claim 1.

14. A system comprising memory which stores instructions for performing the method of claim 1 and a processor in communication with the memory for executing the instructions.

15. A method for learning visual attribute labels for images comprising:
   from textual comments associated with a corpus of images, identifying a set of candidate textual labels that are predictive of aesthetic scores associated with images in the corpus, the identifying comprising,
      for each image, generating a text-based representation of a set of textual features from which the candidate labels are selected,
      optimizing a regression function that outputs a regression coefficient for each the textual features represented in the text-based representation, the optimizing of the regression function is being based on the text-based representations for images in the corpus and respective aesthetic scores for the images, and
      ranking at least some of the textual features based on the regression coefficients;
   clustering the candidate labels in the set into a plurality of visual attribute clusters based on similarity and assigning each of the clusters a visual attribute label;
   for each of the visual attribute labels, training a classifier using visual representations of images in the corpus and respective visual attribute labels;
   evaluating the visual attribute labels based on performance of the trained classifier; and
   retaining a subset of the visual attribute labels based on the evaluation;
   wherein at least one of the identifying a set of candidate textual labels, clustering the candidate labels, training the classifier, and evaluating the classifier performance is performed with a processor.

16. The method of claim 15, wherein the evaluating the visual attribute labels based on a performance criterion comprises comparing performance of each of the visual attribute classifiers with a predefined threshold and the retaining includes retaining the visual attribute labels for the visual attribute classifiers that meet the performance threshold.

17. A method for learning visual attribute labels for images comprising:
- from textual comments associated with a corpus of images, identifying a set of candidate textual labels that are predictive of aesthetic scores associated with images in the corpus, the identifying comprising,
  - for each image, generating a text-based representation of a set of textual features from which the candidate labels are selected,
  - optimizing a regression function that outputs a regression coefficient for each the textual features represented in the text-based representation,
  - identifying a first group of positive regression coefficients and a second group of negative regression coefficients, the ranking of the at least some of the textual features comprising separately ranking the first and second groups, and
  - ranking of the at least some of the textual features based on the regression coefficients, comprising separately ranking the first and second groups;
- clustering the candidate labels in the set into a plurality of visual attribute clusters based on similarity and assigning each of the clusters a visual attribute label;
- for each of the visual attribute labels, training a classifier using visual representations of images in the corpus and respective visual attribute labels;
- evaluating the visual attribute labels based on performance of the trained classifier; and
- retaining a subset of the visual attribute labels based on the evaluation;
- wherein at least one of the identifying a set of candidate textual labels, clustering the candidate labels, training the classifier, and evaluating the classifier performance is performed with a processor.

18. A method for learning visual attribute labels for images comprising:
- from textual comments associated with a corpus of images, identifying a set of candidate textual labels that are predictive of aesthetic scores associated with images in the corpus;
- clustering the candidate labels in the set into a plurality of visual attribute clusters based on similarity and assigning each of the clusters a visual attribute label;
- for each of the visual attribute labels, training a classifier using visual representations of images in the corpus and respective visual attribute labels;
- evaluating the visual attribute labels based on performance of the trained classifier;
- retaining a subset of the visual attribute labels based on the evaluation;
- with the trained classifiers, assigning visual attribute labels to a query image based on a visual representation of the query image; and
- providing for displaying at least one of the assigned visual attribute labels to a user together with an aesthetic score computed for the query image based on the visual representation of the query image,
- wherein at least one of the identifying a set of candidate textual labels, clustering the candidate labels, training the classifier, and evaluating the classifier performance is performed with a processor.

19. A method for learning visual attribute labels for images comprising:
- from textual comments associated with a corpus of images, identifying a set of candidate textual labels that are predictive of aesthetic scores associated with images in the corpus;
- clustering the candidate labels in the set into a plurality of visual attribute clusters based on similarity and assigning each of the clusters a visual attribute label;
- for each of the visual attribute labels, training a classifier using visual representations of images in the corpus and respective visual attribute labels;
- evaluating the visual attribute labels based on performance of the trained classifier; and
- retaining a subset of the visual attribute labels based on the evaluation;
- receiving one of the retained visual attribute labels as a query and retrieving images from a collection of images that are labeled with visual attribute labels selected from the set of visual attribute labels;
- with the trained classifiers for the retained visual attribute labels, assigning visual attribute labels to images in the collection based on visual representations of the images in the collection,
- wherein at least one of the identifying a set of candidate textual labels, clustering the candidate labels, training the classifier, and evaluating the classifier performance is performed with a processor.

20. A system for learning visual attribute labels for images comprising:
- a text representation generator which generates a text-based representation for each of a set of images in a corpus based on textual comments associated with the image;
- an aesthetic score computing component which computes an aesthetic score for each image based on a set of user-applied aesthetic rankings for the images;
- a text feature selector which identifies a set of textual features based on the text representations and respective aesthetic scores for images in the corpus;
- a clustering component which clusters the identified textual features into visual attribute clusters, and assigns each of the visual attribute clusters a visual attribute label;
- an attribute classifier learning component which trains a classifier for each of the visual attributes using visual representations of images in the corpus;
- an attribute ranking component which ranks the visual attribute labels based on performance of the trained classifiers; and
- a processor which implements the text representation generator, aesthetic score computing component, text feature selector, clustering component, attribute classifier learning component and attribute ranking component.

* * * * *